(12) United States Patent
Jang

(10) Patent No.: US 7,641,868 B2
(45) Date of Patent: Jan. 5, 2010

(54) CELL FOR GENERATING DISINFECTION WATER AND SYSTEM USING THE SAME

(76) Inventor: Gwang Woo Jang, 102 Eunhyebilla, 325-5 Yangjae-dong, Seocho-gu, Seoul 137-130 (KR)

( * ) Notice: Subject to any disclaimer, the term of this patent is extended or adjusted under 35 U.S.C. 154(b) by 311 days.

(21) Appl. No.: 10/570,721

(22) PCT Filed: Sep. 3, 2004

(86) PCT No.: PCT/KR2004/002246

§ 371 (c)(1),
(2), (4) Date: May 11, 2006

(87) PCT Pub. No.: WO2005/021442

PCT Pub. Date: Mar. 10, 2005

(65) Prior Publication Data

US 2007/0031305 A1     Feb. 8, 2007

(30) Foreign Application Priority Data

Sep. 3, 2003     (KR) .................. 10-2003-0061530

(51) Int. Cl.
*B01J 19/12* (2006.01)
*B01J 19/24* (2006.01)

(52) U.S. Cl. .............. 422/186.07; 422/186.1; 422/186.15; 422/186.18; 422/186.21; 210/199; 210/205; 204/263; 204/264; 204/265; 204/266; 204/269

(58) Field of Classification Search ............ 422/186.07, 422/186.1, 186.15, 186.18, 186.21; 210/199, 210/205; 204/263, 264, 265, 266, 269
See application file for complete search history.

(56) References Cited

U.S. PATENT DOCUMENTS 5,792,369 A * 8/1998 Johnson ................... 210/748

FOREIGN PATENT DOCUMENTS

KR     99-85959 A     * 12/1999

* cited by examiner

*Primary Examiner*—Bruce F Bell
(74) *Attorney, Agent, or Firm*—Ladas & Parry LLP

(57) ABSTRACT

The present invention relates to a cell for generating sterilized water in which lead wires having cathode and anode are alternately wound on a body in the horizontal direction, the cell is disposed in plural in the vertical direction to the flow of water by a given distance so that a plasma reaction is generated between both lead wires wound on the cell in the linear direction along the lead wires thereby increasing reaction efficiency per surface area of the cell. The cell comprises a body of a square shape including a pair of vertical frames in which a plurality of first and second grooves having a different depth are alternately formed correspondingly to each other, wherein the body has a plurality of support frames disposed between a pair of vertical frames in a lattice shapes, anode and cathode electrode poles respectively inserted into the pair of the vertical frames, a first lead wire wound on the plurality of the first grooves with one side being brought into contact with the anode electrode pole, and a second lead wire wound on the plurality of the second grooves in parallel with the first lead wire with one side being brought into contact with the cathode electrode pole.

3 Claims, 7 Drawing Sheets

CELL FOR GENERATING DISINFECTION WATER AND SYSTEM USING THE SAME

TECHNICAL FIELD

The present invention relates to a cell for generating sterilized water. More particularly, the present invention relates to a cell for generating sterilized water in which lead wires having cathode and anode are alternately wound on a body in the horizontal direction, the cell is disposed in plural in the vertical direction to the flow of water by a given distance so that a plasma reaction is generated between both lead wires wound on the cell in the linear direction along the lead wires thereby increasing reaction efficiency per surface area of the cell.

Further, the present invention relates to an apparatus for generating sterilized water using the cell for generating sterilized water in which the amount of sterilized water generated can be increased since a high sterilizing power is obtained even for a short-term operation and efficiency can be increased as high current is used.

BACKGROUND ART

Generally, an apparatus for generating sterilized water is adapted to sterilize industrial wastewater, sewage, water for a swimming pool, water for a cooling tower and the like by generating ozone or active oxygen.

In the conventional apparatus for generating sterilized water, active oxygen and ozone bubble are generated through a cell for discharge which is wound in a mesh shape so that anode and cathode lead wires intersect each other, as disclosed in Korean Patent Registration No. 199509.

In this mesh type cell, however, an explosion reaction is generated at the intersection of the anode and cathode platinum lead wires in order to generate ozone bubble. Accordingly, there is a problem in that the lead wires are cut due to excessive current during the reaction. Further, a portion from which ozone bubble is generated is limited to the intersection of both lead wires. Therefore, there is a problem in that efficiency is low compared to a case where lots of platinum lead wires are used.

DISCLOSURE OF INVENTION

Accordingly, the present invention has been made in view of the above problems, and it is an object of the present invention to provide a cell for generating sterilized water in which lead wires having cathode and anode are alternately wound on a body in the horizontal direction, the cell is disposed in plural in the vertical direction to the flow of water by a given distance so that a plasma reaction is generated between both lead wires wound on the cell in the linear direction along the lead wires thereby increasing reaction efficiency per surface area of the cell.

Another object of the present invention is to provide an apparatus for generating sterilized water using the cell for generating sterilized water in which the amount of sterilized water generated can be increased since a high sterilizing power is obtained even for a short-term operation and efficiency can be increased as high current is used.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

To achieve the above objects, according to the present invention, there is provided a cell for generating sterilized water, including: a body of a square shape including a pair of vertical frames in which a plurality of first and second grooves having a different depth are alternately formed correspondingly to each other, wherein the body has a plurality of support frames disposed between a pair of vertical frames in a lattice shape, anode and cathode electrode poles respectively inserted into the pair of the vertical frames, a first lead wire wound on the plurality of the first grooves with one side being brought into contact with the anode electrode pole, and a second lead wire wound on the plurality of the second grooves in parallel with the first lead wire with one side being brought into contact with the cathode electrode pole.

The first and second lead wires are spaced by 1.2 to 2 mm.

According to the present invention, there is provided an apparatus for generating sterilized water having a control unit for applying the power and controlling various valves, comprising a pump for absorbing non-sterilized water from the source of a river under the control of the control unit, a filter disposed at the front end of the pump, for filtering alien substance contained in the non-sterilized water, a first cell box that generating a first plasma reaction for sterilizing the non-sterilized water through ionization and explosion and discharges the sterilized water, under the control of the control unit, and a second cell box that generating a second plasma reaction for sterilizing the non-sterilized water through ionization and explosion and discharges the sterilized water, under the control of the control unit.

Each of the first and second cell boxes comprises a housing having a space therein and through hole at both sides, and a plurality of cell that are disposed in a space of the housing vertically to a direction along which sterilized water or non-sterilized water proceeds with a given distance therebetween so that some of anode and cathode electrode poles are protruded to the top of the housing.

Accordingly, according to the present invention, as a reaction effect per surface area of a cell is increased, a high sterilizing power can be obtained even for a short-term operation and the amount of sterilized water generated can be thus increased. Further, efficiency can be increased by using high current.

A cell for generating sterilized water and an apparatus for generating sterilized water using the same will now be described in detail in connection with preferred embodiments of the present invention with reference to the accompanying drawings.

Figure 1:
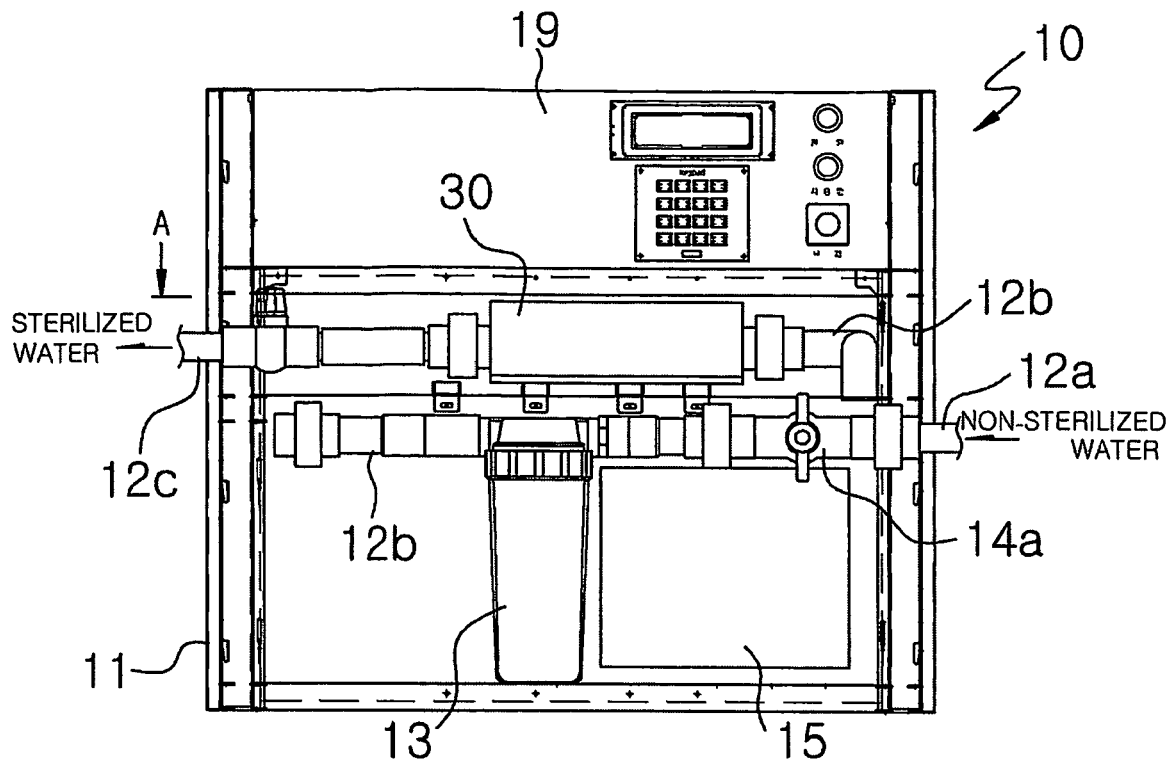
FIG. 1 is a front view illustrating the construction of an apparatus for generating sterilized water according to the present invention.
Figure 2:
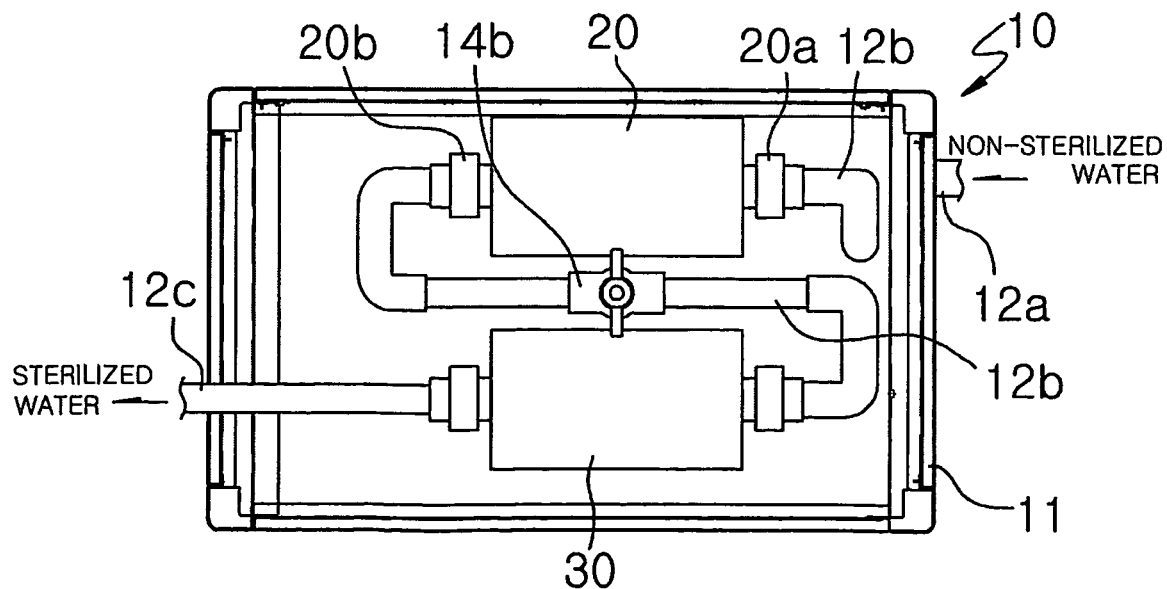
FIG. 2 is a plan view of the apparatus viewed from a direction 'A' in FIG. 1.
Figure 3:
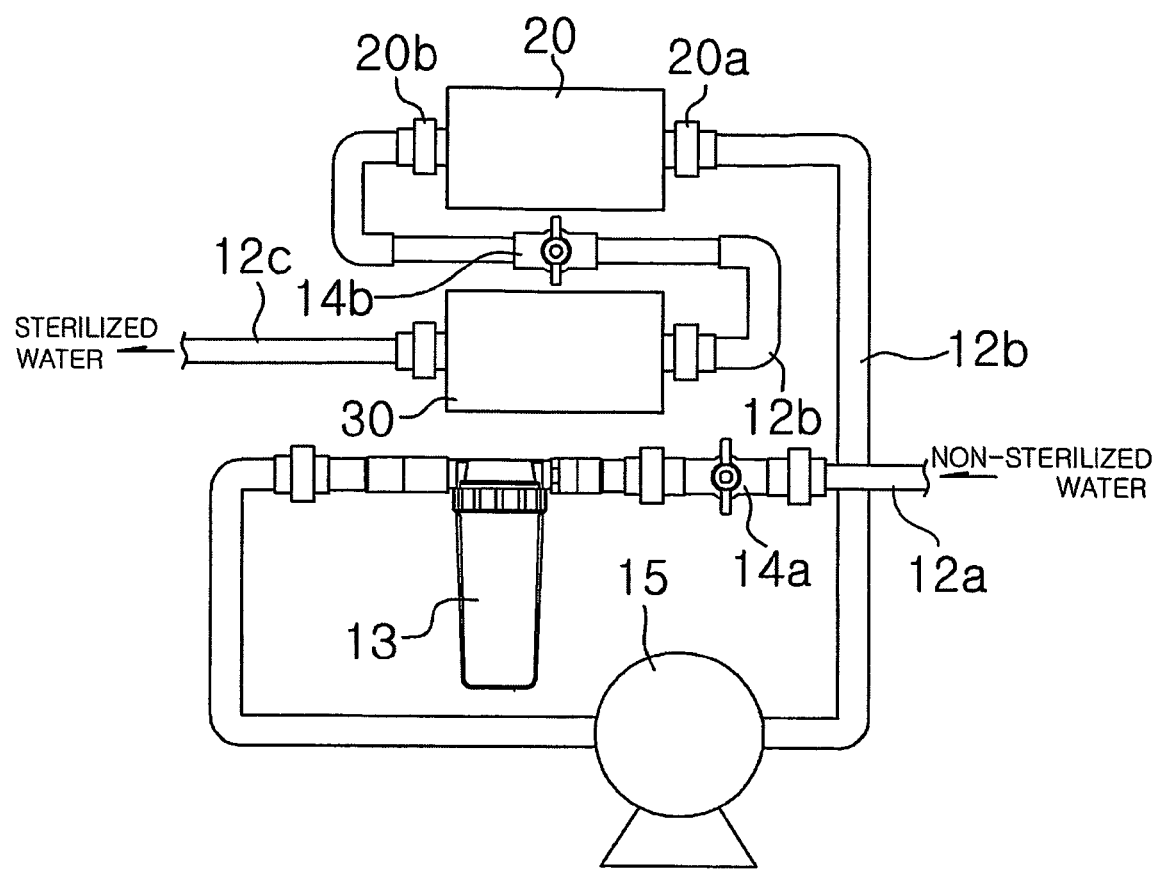
FIG. 3 is a schematic view showing the entire construction of the apparatus for generating sterilized water according to the present invention.

FIG. 1 is a front view illustrating the construction of an apparatus for generating sterilized water according to the present invention. FIG. 2 is a plan view of the apparatus viewed from a direction 'A' in FIG. 1. FIG. 3 is a schematic view showing the entire construction of the apparatus for generating sterilized water according to the present invention.

A general construction of the apparatus for generating sterilized water according to the present invention will be first described.

Referring to FIG. 1 to FIG. 3, a pump 15 for receiving non-sterilized water from the source of a river through an introduction pipe 12a is disposed at the bottom of a housing 11. A filter 13 for filtering alien substance contained in the introduced water is disposed at the front end of the pump 15.

Further, first and second cell boxes 20, 30 for sterilizing the filtered non-sterilized water that is received through the pump 15 are disposed at an upper side of the housing 11. In this case, the non-sterilized water is firstly sterilized in the first cell box 20, secondarily sterilized in the second cell box 30 and is then discharge to the outside through a discharge pipe 12c.

Ball valves 14a, 14b for controlling the flow and flux of water are disposed between the introduction pipe 12a and the filter 13 and between the first and second cell boxes 20, 30, respectively.

Figure 4:
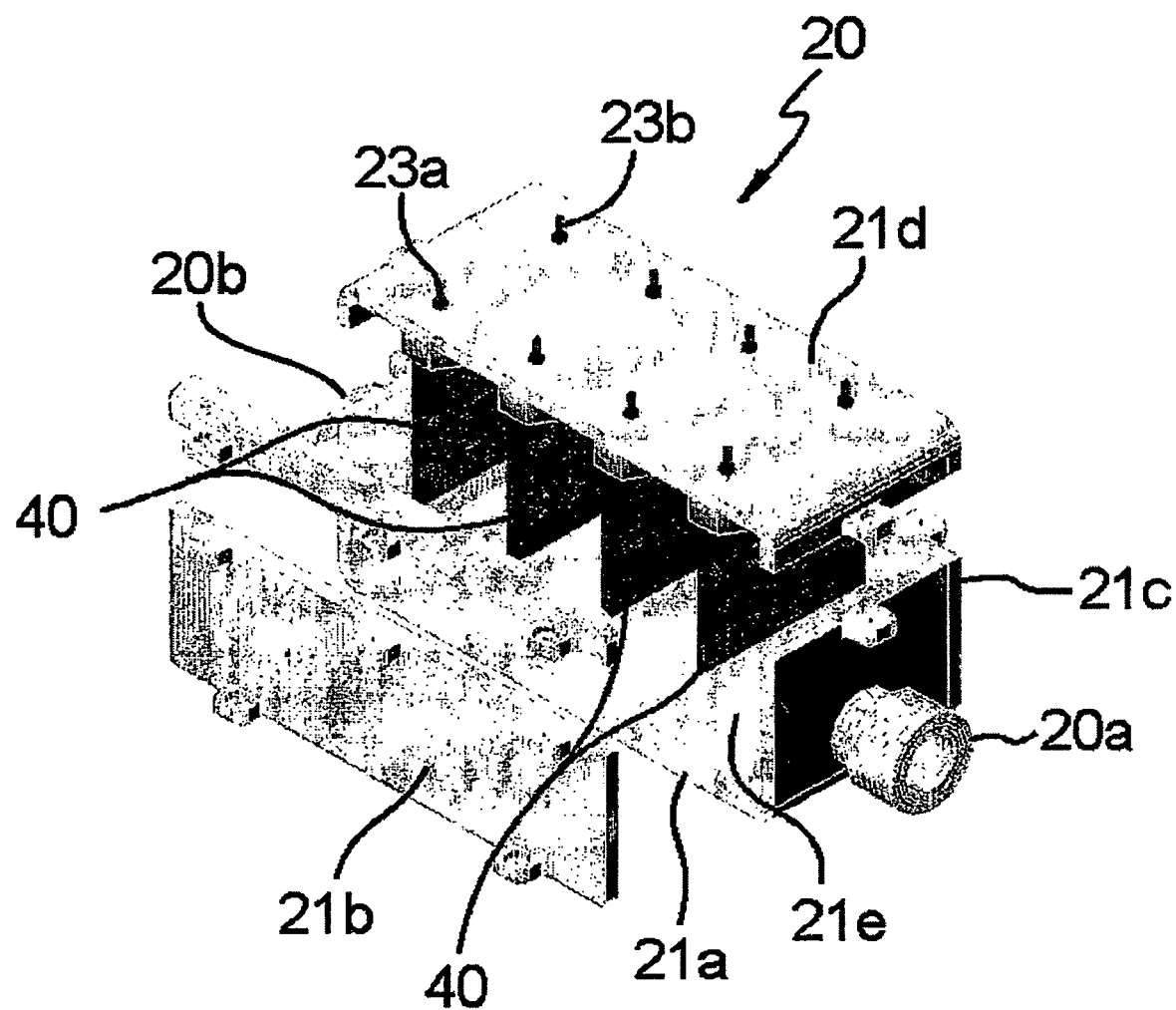
FIG. 4 is a dismantled perspective view showing the cell box of the apparatus for generating sterilized water according to the present invention.

FIG. 4 is a dismantled perspective view showing the cell box of the apparatus for generating sterilized water according to the present invention.

The first and second cell boxes 20, 30 have the same construction. The construction of the cell box will now be described in detail with reference to the accompanying drawings only with respect to the first cell box 20.

Referring to FIG. 4, the first cell box 20 includes a base 21a having a space 21e therein, and sockets 20a, 20b each connected to a connecting pipe 12b at its front and rear sides, and housings 21a, 21b, 21c and 21d of a rectangular parallelepiped shape including lateral plates 21b, 21c each assembled to the left and right sides of the base 21a and an upper plate 21d assembled on the base 21a.

Further, in the space 21e of the housings 21a, 21b, 21c and 21d, a plurality of cells 40 having the same construction are disposed in the axial direction of the connecting pipe 12b, i.e., in the vertical direction to a direction along which the non-sterilized water proceeds in a state where both sides of the spaces 21e are fixed to the upper plate 21d of the housings 21a, 21b, 21c and 21d.

Figure 5:
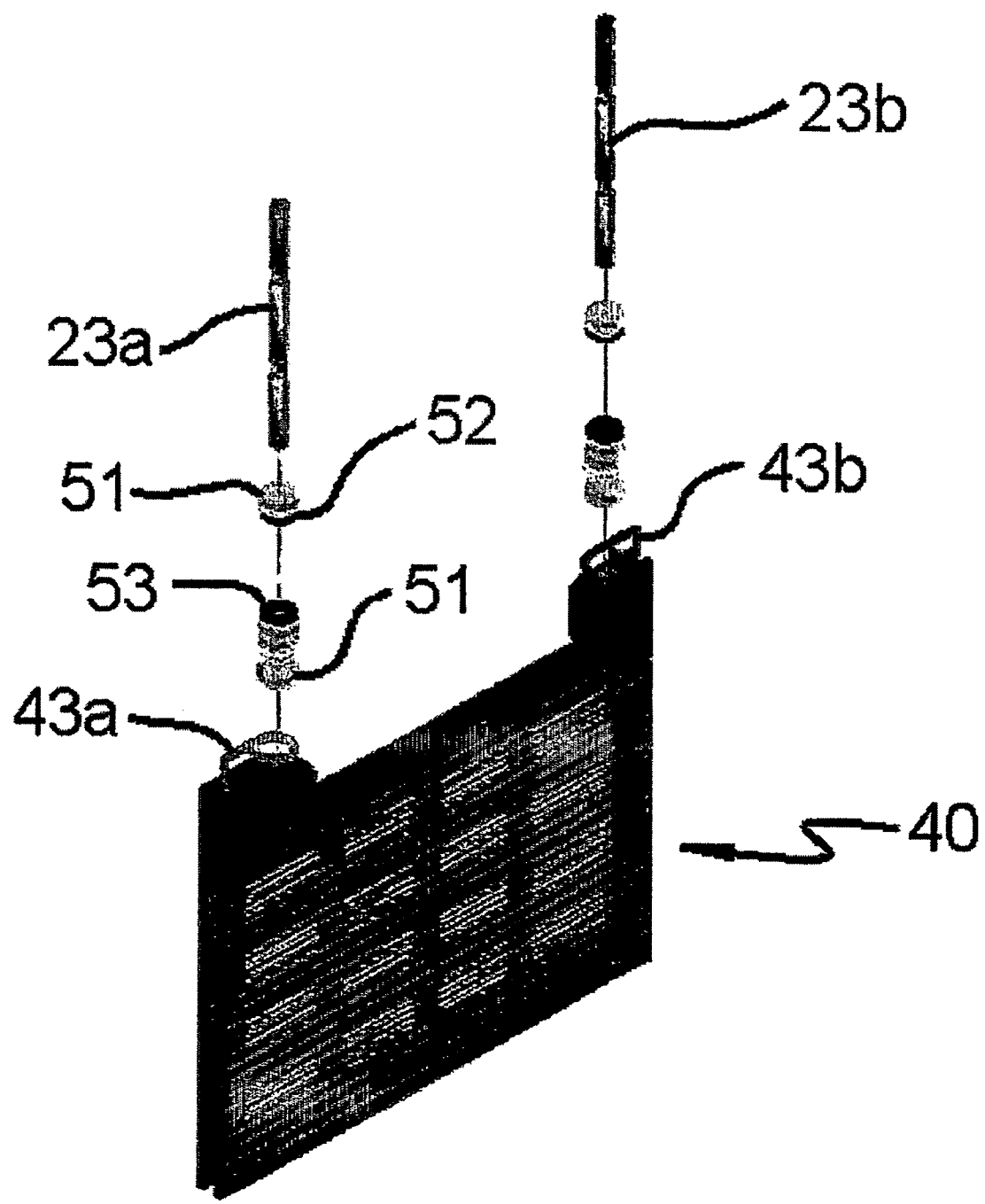
FIG. 5 is a perspective view illustrating the cell of the apparatus for generating sterilized water according to the present invention.
Figure 6:
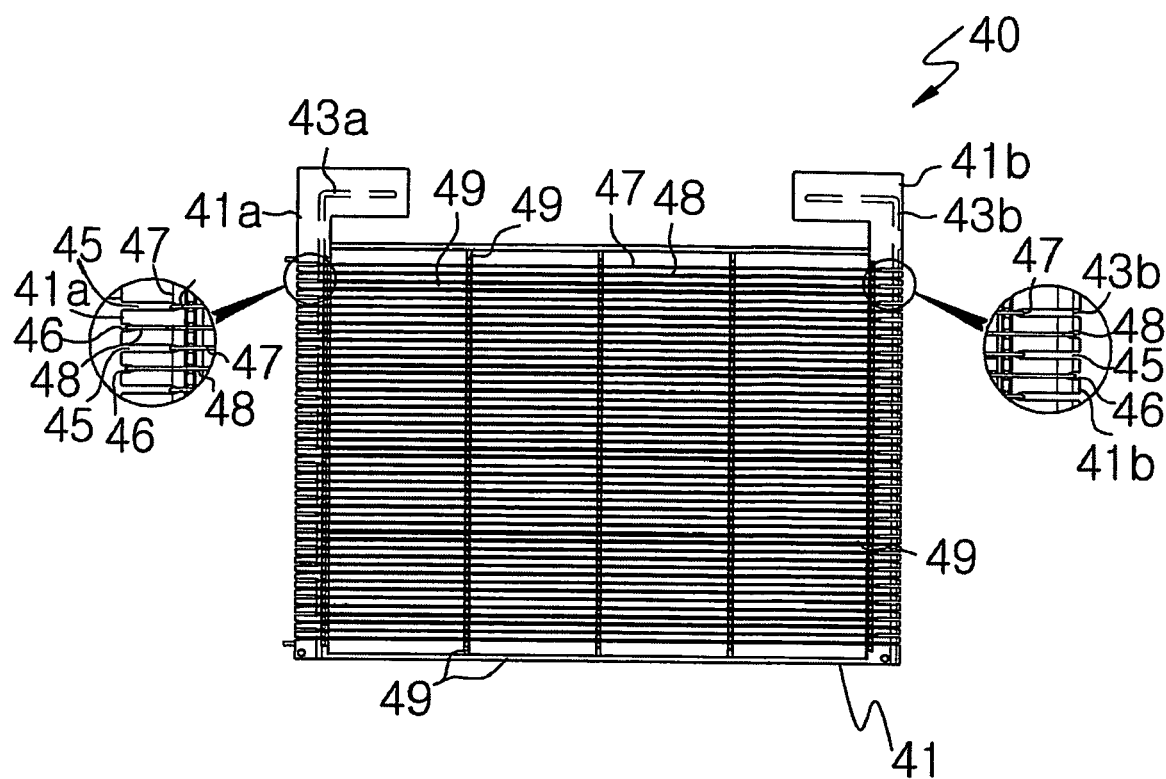
FIG. 6 is a front view illustrating the cell of the apparatus for generating sterilized water according to the present invention.
Figure 7:
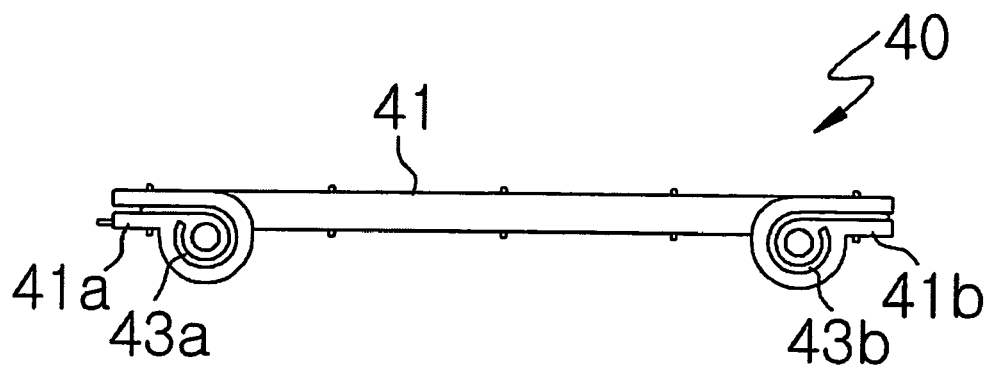
FIG. 7 is a plan view illustrating the cell of the apparatus for generating sterilized water according to the present invention.
Figure 8:
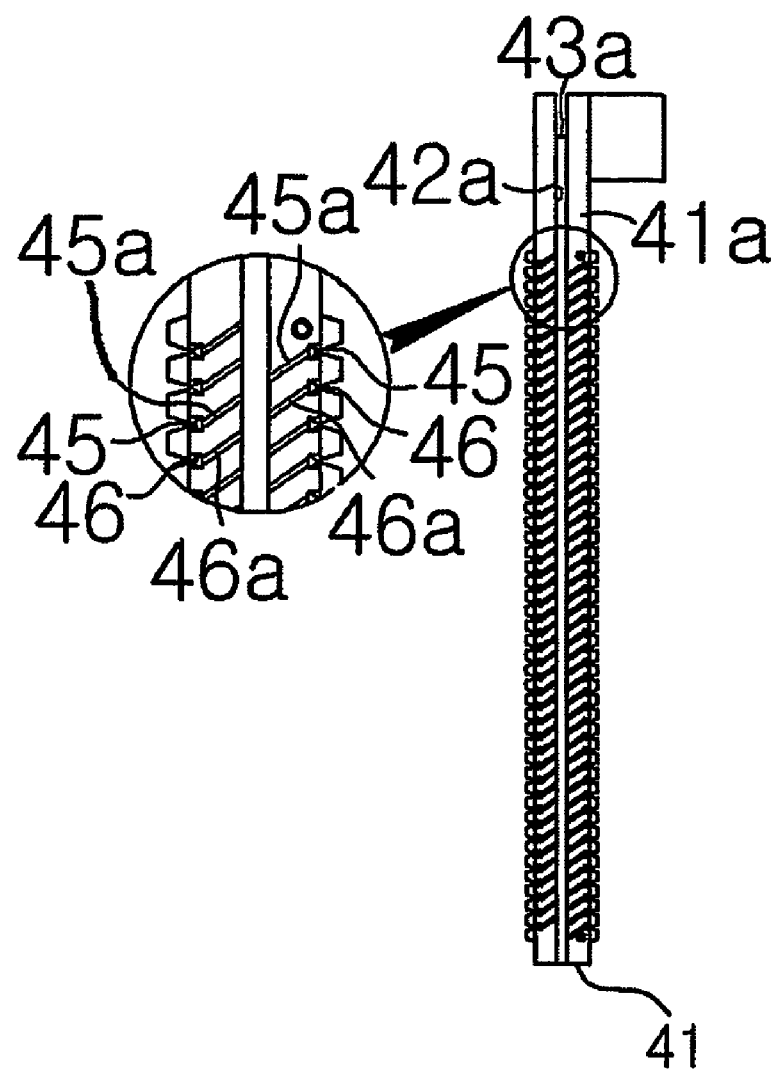
FIG. 8 is a left lateral view showing the cell from which the platinum lead wire is removed according to the present invention.
Figure 9:
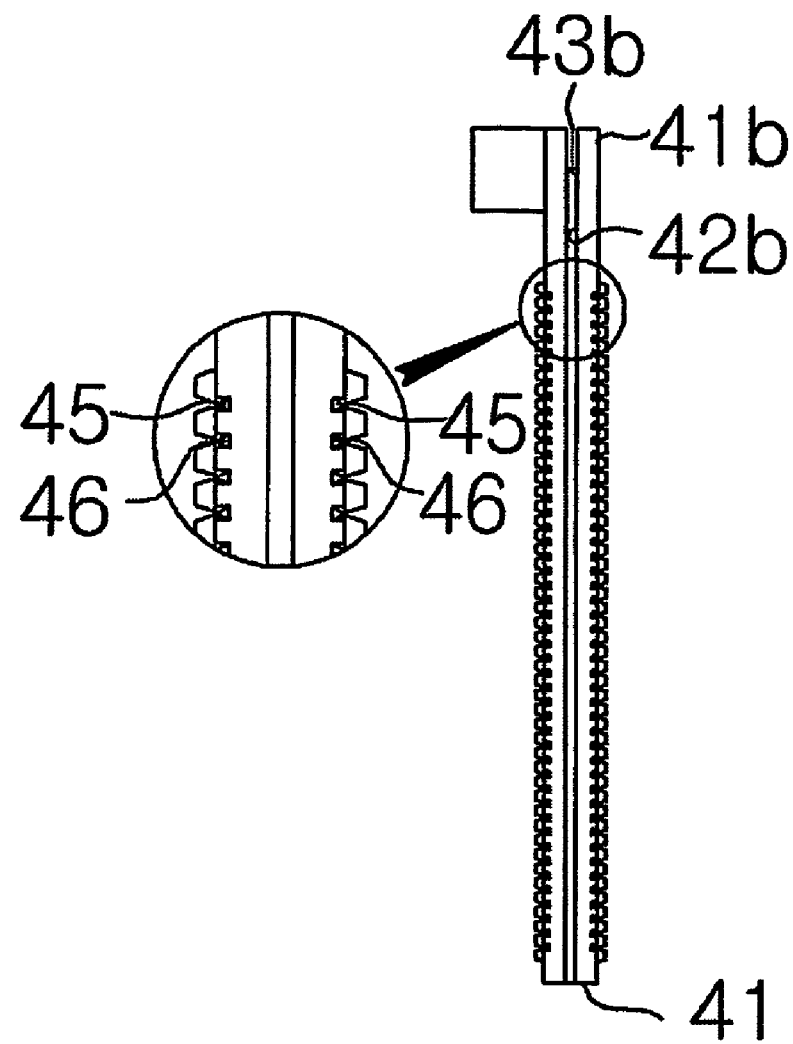
FIG. 9 is a right lateral view showing the cell from which the platinum lead wire is removed according to the present invention.

FIG. 5 is a perspective view illustrating the cell of the apparatus for generating sterilized water according to the present invention. FIG. 6 is a front view illustrating the cell of the apparatus for generating sterilized water according to the present invention. FIG. 7 is a plan view illustrating the cell of the apparatus for generating sterilized water according to the present invention. FIG. 8 is a left lateral view showing the cell from which the platinum lead wire is removed according to the present invention. FIG. 9 is a right lateral view showing the cell from which the platinum lead wire is removed according to the present invention.

The plurality of the cells 40 includes a body 41 having first and second vertical frames 41a, 41b, and support frames 49 for supporting the first and second vertical frames 41a, 41b, wherein the support frame 49 disposed within the first and second vertical frames 41a, 41b in a lattice shape, as shown in FIG. 6.

In this case, it is preferred that the plurality of the support frames 49 has a thickness of the degree that does not hinder the flow of the non-sterilized water so that the non-sterilized water can pass the cell 40 smoothly.

Also, the first and second vertical frames 41a, 41b have a plurality of first and second grooves 45, 46 formed therein. In the above, the first and second grooves 45, 46 have their tops curved and are alternately formed in a different depth so that they correspond to each other.

Moreover, the first and second vertical frames 41a, 41b have first and second electrode pole insertion grooves 42a, 42b formed therein along a length direction, as shown in FIG. 8 and FIG. 9. In this case, first and second internal electrode poles 43a, 43b are inserted into the first and second electrode pole insertion grooves 42a, 42b.

At this time, the first and second internal electrode poles 43a, 43b are curved so that the tops of the electrode poles 43a, 43b are seated on the first and second vertical frames 41a, 41b and thus correspond to the first and second external electrode poles 23a, 23b, respectively, through a nut 51 and a washer 52, as shown in FIG. 5.

In addition, the first and second external electrode poles 23a, 23b are protruded outwardly through the top 21d of the housing in order to receive anode and cathode currents from the power supply so that the internal electrode poles 43a, 43b have anode and cathode, as shown in FIG. 4. In this case, a sealing element 53 for airtight is coupled to a portion that penetrates the upper plate 21d of the first cell box 20, as shown in FIG. 5.

Meanwhile, the first and second lead wires 47, 48 made of platinum are consecutively wound on a plurality of first grooves 45 and extension grooves 45a and a plurality of second grooves 47 and extension grooves 47b with one ends of the first and second lead wires 47, 48 being brought into contact with the first and second internal electrode poles 43a, 43b.

In this case, the first and second lead wires 47, 48 are alternately wound in parallel with the body 41 at a distance of 1.2 to 2 mm depending on the type of a medium to be sterilized, i.e., common, wastewater, salt water, etc.

In this time, the first and second lead wires 47, 48 are impossible to wind at a distance of below 1.2 mm. Further, if the first and second lead wires 47, 48 are wound at a distance of 2 mm or more, there is a problem in that a sterilizing effect is lowered as the plasma reaction is very weak.

One sides of the first and second lead wires 47, 48 transfer the current to the other sides thereof whenever the first and second lead wires 47, 48 are wound on the first and second internal electrode poles 43a, 43b once. As the current is prevented from decreasing due to resistance of the lead wires themselves when it is transferred from one side of the cell 40 to the other side of the cell 40 along the first and second lead wires, the current of a constant value flows into the first and second lead wires 47, 48.

In this case, when the power is turned on, the first and second lead wires 47, 48 which correspond in parallel with each other have cathode and anode, respectively, so that a plasma reaction is consistently generated between the first and second lead wires 47, 48. In this time, non-sterilized water that passes through the first and second lead wires 47, 48 undergoes ionization and explosion.

Meanwhile, it has been described that the number of the cell box is limited to 2 in this embodiment. It is, however, to be noted that a number of cell boxes can be disposed in parallel in proportion to the amount of water to be sterilized.

Accordingly, the non-sterilized water that passes through the first cell box 20 is firstly sterilized and is then secondarily sterilized through the second cell box 30.

In this case, a conventional cell is wound crosswise so that the anode and cathode lead wire cross each other. Thus, a point where the plasma reaction happens is limited to a cross portion of the anode and cathode lead wires, i.e., a point. In the case of the cell 40 according to the present invention, however, the plasma reaction point reacts along the line at a portion where the first and second lead wires 47, 48 correspond to each other since the first and second lead wires 47, 48 correspond in parallel with each other. Therefore, a reaction occurs at a lot of places compared to a prior art.

Further, the plurality of the cells 40 is disposed in the vertical direction to the flow of the non-sterilized water. Thus, a plasma reaction effect per surface area of a cell is high. Accordingly, a high sterilizing power can be obtained even with a short-term operation of the sterilization apparatus.

Furthermore, the first and second lead wires 47, 48 can be made of platinum with a reduced amount compared to a prior art. It is thus possible to reduce the cost.

Results of analysis into raw water of Yangjae Stream (Seoul, Korea) using the cell 40 and the apparatus for generating sterilized water 10 having the cell 40 are listed in Table 1 by the sterilizing time.

Analysis results of Table 1 are test results based on the test item and the test method which are authorized by Korea Lavoratory Accreditation Scheme (KOLAS). The subject of the test is Water Quality Testing Center of Woongiin Coway Co., Ltd., the date of the test "Jun. 30 to Jul. 03, 2003" and the test method is carried out through "Drinking Water Process Test Method."

were mixed, both a total of a colon bacilli group and a colon *bacillus* were detected like when raw water of Yangjae Stream is 100%. However, common bacilli were reduced by about 300 times compared to Yangjae Stream raw water 100%.

Meanwhile, in the case (C) in which 50% of Yangjae Stream raw water and 50% of sterilized water that undergoes reaction in the apparatus for generating sterilized water for 10 minutes were mixed, common bacilli were reduced by about 300 times compared than Yangjae Stream raw water 100%, but a total colon *bacillus* group and a colon *bacillus* were not detected.

In the same manner, in the case (D) in which 100% of sterilized water that undergoes reaction in the apparatus for generating sterilized water for 15 minutes, common bacilli are reduced by about 300 times compared to Yangjae Stream raw water 100% like the C condition, but a total colon *bacillus* group and a colon *bacillus* were not detected.

The apparatus for generating sterilized water according to the present invention can perform twice sterilization processes since it includes two cell boxes of the first and second cell boxes 20, 30. Thus, these analysis results has a sterilization power of the degree in which water of a river can be used as drinking water even when the apparatus is operated for about 10 to 15 minutes.

Further, as the first and second lead wires 47, 48 having cathode and anode are disposed in parallel with each other, a reaction point is amplified to accelerate ionization and explosion of water. It is thus possible to provide a large amount of sterilized water.

INDUSTRIAL APPLICABILITY

As described above, according to the present invention, a reaction effect per surface area of a cell is increased. Thus, there are effects in that a sterilizing power is high even for a

TABLE 1

| | Common bacilli Below 100 CFU/mL | Total colon bacillus group Non-detection/ 100 mL | Colon bacillus Non-detection/100 mL | of Concentration hydrogen ion 5.8~8.5 | Chromaticity Below 5 degree |
|---|---|---|---|---|---|
| A | 43,000 | Detection | Detection | 7.4 | 27 |
| B | 140 | Detection | Detection | 7.4 | 34 |
| C | 150 | Non-detection | Non-detection | 7.4 | 41 |
| D | 160 | Non-detection | Non-detection | 7.4 | 24 |

In Table 1, A is Yangjae Stream raw water, B is 50% of Yangjae Stream raw water+50% of sterilized water that undergoes reaction in the apparatus for generating sterilized water for 5 minutes, C is 50% of Yangjae Stream raw water+ 50% of sterilized water that undergoes reaction in the apparatus for generating sterilized water for 10 minutes, and D is 100% of sterilized water that undergoes reaction in the apparatus for generating sterilized water for 15 minutes.

From Table 1, it can be seen that in the case (A) in which raw water of Yangjae Stream is not sterilized, common colon bacilli were 43,000 and both a total of a colon bacilli group and a colon *bacillus* were detected.

Further, in the case (B) in which 50% of Yangjae Stream raw water and 50% of sterilized water that undergoes reaction in the apparatus for generating sterilized water for 5 minutes short-term operation, the amount of sterilized water generated is increased and efficiency is increased with low cost by using low current.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A cell for generating sterilized water, comprising: a body of a square shape including a pair of vertical frames in which a plurality of first and second grooves having a different depth are alternately formed correspondingly to each other, wherein a the body has a plurality of support frames disposed between a pair of vertical frames in a lattice shape;

anode and cathode electrode poles respectively inserted into the pair of the vertical frames;

a first lead wire wound on the plurality of the first grooves with one side being brought into contact with the anode electrode pole; and a second lead wire wound on the plurality of the second grooves in parallel with the first lead wire with one side being brought into contact with the cathode electrode pole.

2. The cell as claimed in claim 1, wherein the first and second lead wires are spaced by 1.2 to 2 mm.

3. An apparatus for generating sterilized water having a control unit for applying the power and controlling various valves, comprising:

A pump for absorbing non-sterilized water from the source of a river under the control of the control unit;

A filter disposed at the front end of the pump, for filtering alien substance contained in the non-sterilized water;

A first cell box that generating a first plasma reaction for sterilizing the non-sterilized water through ionization and explosion and discharges the sterilized water, under the control of the control unit; and A second cell box that generating a second plasma reaction for sterilizing the non-sterilized water through ionization and explosion and discharges the sterilized water, under the control of the control unit;

wherein each of the first and second cell boxes comprises:

a housing having a space therein and through hole at both sides; and a plurality of cell that are disposed in a space of the housing vertically to a direction along which sterilized water or non-sterilized water proceeds with a given distance therebetween so that some of anode and cathode electrode poles are protruded to the top of the housing.

* * * * *